United States Patent [19]
Smith, Jr. et al.

[11] 3,816,780
[45] June 11, 1974

[54] ROTOR STRUCTURE FOR SUPERCOOLED FIELD WINDING

[75] Inventors: Joseph L. Smith, Jr., Concord; Philip Thullen, Dover, both of Mass.

[73] Assignee: Massachusetts Institute of Technology, Cambridge, Mass.

[22] Filed: Aug. 18, 1972

[21] Appl. No.: 281,816

[52] U.S. Cl. .................................................. 310/52
[51] Int. Cl. ............................................... H02k 9/00
[58] Field of Search .................... 310/40, 10, 52, 54

[56] References Cited
UNITED STATES PATENTS

| | | | |
|---|---|---|---|
| 3,517,231 | 6/1970 | Massai | 310/52 |
| 3,648,082 | 3/1972 | MacNab et al. | 310/10 |
| 3,657,580 | 4/1972 | Doyle | 310/10 X |
| 3,665,229 | 5/1972 | Lorch | 310/52 |
| 3,679,920 | 7/1972 | MacNab et al. | 310/52 X |

*Primary Examiner*—D. F. Duggan
*Attorney, Agent, or Firm*—Arthur A. Smith, Jr.; Martin M. Santa; Joseph S. Iandiorio

[57] ABSTRACT

A rotor for a cryogenic machine having a supercooled field winding including a hollow shaft rotatably supported on axle means and having an internal vacuum chamber; a field winding structure having radial interstices and axial interstices; a field winding structure compartment carried by the shaft for supporting the field winding structure; low thermal conductivity interconnection means interconnecting the compartment with the axle means; at least one heat exchanger means including a first member in thermal communication with the interconnection means at a discrete position along the interconnection means for removing heat from the interconnection means and a second member including a first conduit in thermal communication with the first member for removing heat from the first member using supercooled fluid flowing through the first conduit at a temperature higher than that of the supercooled field winding; and a convection trap associated with each heat exchanger means including a second conduit interconnected with the first conduit and having a portion having a course extending from larger to small radius to trap the warmer less dense fluid nearer the center of the rotor and the colder more dense fluid nearer the periphery of the rotor to prevent centrifugal convection in the centrifugal force field of the rotor.

23 Claims, 7 Drawing Figures

ROTOR STRUCTURE FOR SUPERCOOLED FIELD WINDING

FIELD OF INVENTION

This invention relates to a rotor structure for supporting and cooling a superconducting field winding, and more particularly to an improved field winding support structure having interstices to promote passage of supercooling fluid, to a convection trap to prevent centrifugal convection in the supercooling system in the centrifugal force field of the rotor and to an isolated junction between the superconducting supercooled leads and normal conducting ambient temperature leads.

BACKGROUND OF INVENTION

In conventional electrical machines, the required magnetic field can be obtained economically only if the magnetic circuit is high permeability iron except for the small air gaps between the rotor and stator. When superconductors are used for the field winding, the magnetic field can be obtained economically without the aid of such high permeability materials. However with the removal of the need and even the desirability for an iron structure there arises the need for another support structure capable of withstanding the generated forces and also capable of providing good thermal insulation for the field winding. Such a support structure must also provide for permeation of the superconducting field winding with supercooling fluid. Both the field winding support structure and the supercooling system must function to permit proper cooling of the field winding in the centrifugal force field of the rotor. In addition provision is required to minimize the transfer of heat from the normally conducting leads to the superconducting leads.

SUMMARY OF INVENTION

It is therefore an object of this invention to provide an improved rotor assembly for supporting a superconducting field winding.

It is a further object of this invention to provide an improved field winding structure which is compact and sufficiently rugged to withstand the forces generated in operation, and which includes interstices for permeating the field winding with supercooling fluid.

It is a further object of this invention to provide a convection trap for preventing centrifugal convection currents in the supercooling system due to the centrifugal force field of the rotor.

It is a further object of this invention to improve the efficiency of refrigeration of the rotor by using discrete heat exchangers.

It is a further object of this invention to minimize heat transfer from the normal leads to the superconductors in the winding and for cooling of the normal leads.

The invention features a rotor for a cryogenic machine having a supercooled field winding including a hollow shaft rotatably supported on axle means and having an internal vacuum chamber. There is a field winding structure having radial interstices, axial interstices and circumferential interstices for passing supercooling fluid and a field winding structure compartment carried by the shaft for supporting the field winding structure. Low thermal conductivity interconnection means interconnect the compartment with the axle means. There is at least one heat exchanger means including a first member in thermal communication with the interconnection means at a discrete position along the interconnection means for removing heat from the interconnection means. A second member includes a first conduit in thermal communication with the first member for removing heat from the first member using supercooled fluid flowing through the first conduit at an average temperature higher than that of the supercooled field winding. A convection trap associated with each heat exchanger means includes a second conduit interconnected with the first conduit and having a portion having a course extending from larger to smaller radius to trap the warmer less dense fluid nearer the center of the rotor and the colder more dense fluid nearer the periphery of the rotor to prevent centrifugal convection in the centrifugal force field of the rotor.

DISCLOSURE OF PREFERRED EMBODIMENT

Other objects, features, and advantages will occur from the following description of a preferred embodiment and the accompanying drawings, in which.

Figure 1:
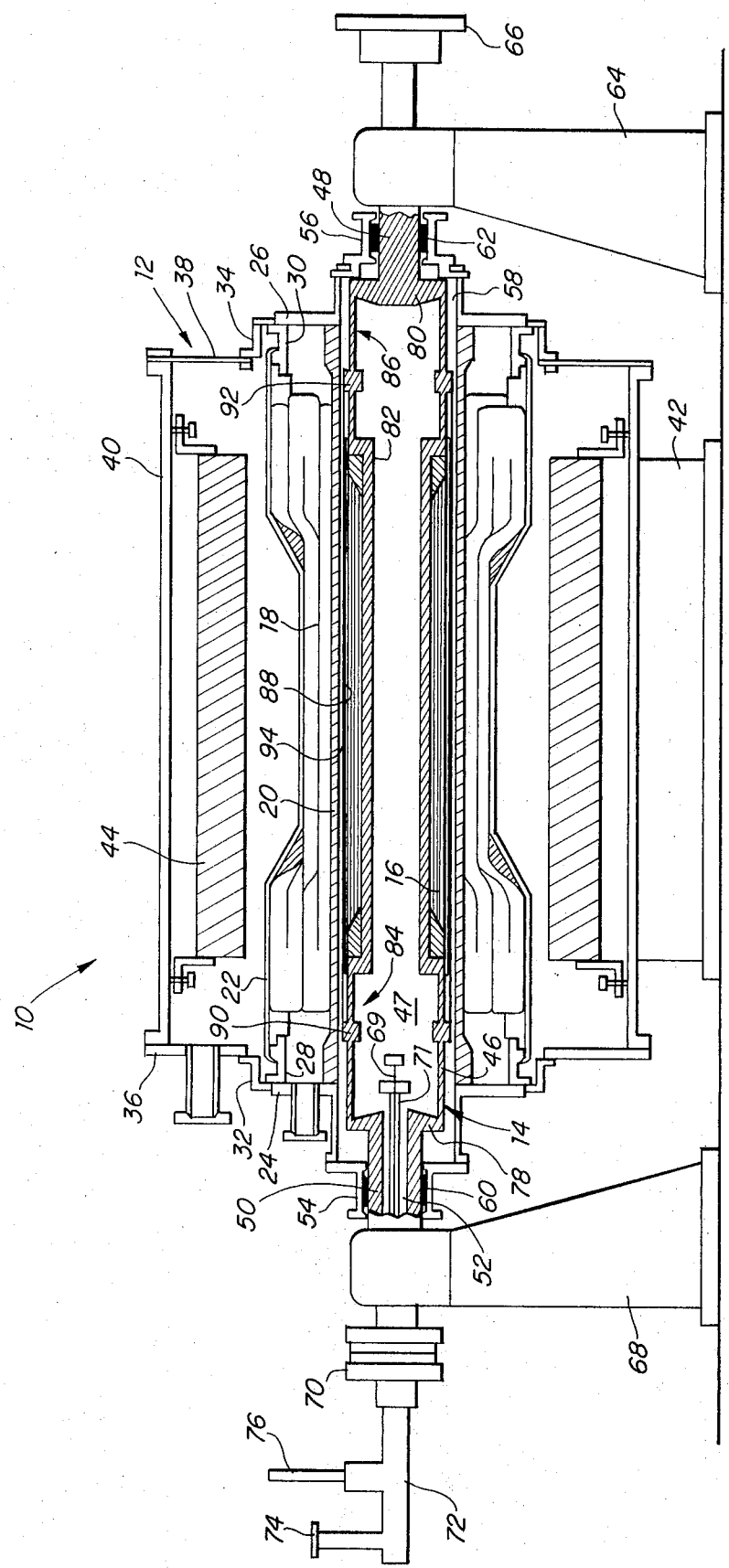
FIG. 1 is a schematic, elevational view of an electrical machine having a superconducting field winding according to this invention with portions of the machine shown in cross-section.

There is shown in FIG. 1 an electrical machine 10 having a stator 12 and a rotor 14 which carries a superconducting field winding 16. Stator 12 includes an armature winding 18 mounted on a support tube 20 and surrounded by a torque tube 22. Annular flanges 24 and 26 are interconnected with torque tube 22 by means of end members 28 and 30 at opposite ends of torque tube 22 and are also interconnected with opposite ends of inner support tube 20. A second set of annular flanges 32 and 34 interconnect flanges 24 and 26 with a third set of flanges 36 and 38. Flanges 36 and 38 are connected directly to outer frame 40 of machine 10 which is mounted on base 42. Outer frame 40 acts as an image shield to contain the magnetic field within the machine. This may also be done by means of an iron shield 44 mounted within frame 40.

Rotor 14 includes a hollow shaft 46 which forms an inner chamber 47 maintained as a vacuum. Shaft 46 includes a solid stub axle 48 at the drive end of machine 10 and a hollow stub axle 50 at the exciter end of machine 10. The electrical leads and the supercooled fluid, typically helium, are accessed through the bore 52 in hollow stub axle 50. Vacuum seal housings 54 and 56 mounted on stator 12 sealingly engage stub axles 50 and 48, respectively, to secure a vacuum in the gap 58 between the rotor and stator conventionally referred to as an air gap. The use of a vacuum instead of air or some other medium in vacuum gap 58 substantially reduces windage losses. Seals 60 and 62 may be oil buffered high vacuum seals such as those used to seal shafts in oil sealed vacuum pumps and hydrogen cooled generators. Stub axle 48 is supported by bearing stand 64 through which it passes to engage a couping 66 coupled to the prime mover. Stub axle 50 passes the electrical leads, not shown, for connection to the slip rings 70 and passes the inlet 69 and outlet 71 conduits for delivering the supercooled fluid, such as liquid helium, to and from the interior of rotor 14 by means of the helium transfer coupling system 72, which includes a helium inlet 74 and helium outlet 76.

In rotor 14 each of stub axles 50 and 48 include enlarged inner end flanges 78 and 80 which are interconnected with a central compartment 82, recessed in shaft 46 for carrying field winding 16, by means of low thermal conductivity tube portions 84 and 86. Compartment 82 need not be recessed but may as well be salient or partially salient as relates to the surface of shaft 46. A similar tube portion 88, FIG. 2, covers compartment 82. Tube portions 84 and 86 are typically thin wall stainless steel tubes. Heat exchangers 90 and 92 interconnect with tube portions 84 and 86 between compartment 82 and flanges 78 and 80. A copper radiation shield 94 extends in vacuum gap 58 covering field winding 16 in compartment 82 and is attached at heat exchangers 90, 92. Shield 94 may extend around the ends of heat exchangers 90, 92 as illustrated by shields 94a, 94b. Shield 94 typically operates at 20° K and insulates the field winding 16 by intercepting the thermal radiation from the warmer environment in the surrounding stator and conducting it to heat exchangers 90 and 92. The copper shield also protects field winding 16 from alternating magnetic fields caused by load imbalance. Although shaft 46 is shown supported at each end by axles 48, 50 this is not a necessary limitation. Shaft 46 may be rotatably mounted on one shaft through which the prime mover, electrical, and cooling connections are made. In such a construction only one tube portion 84, 86 would be used.

Figure 2:
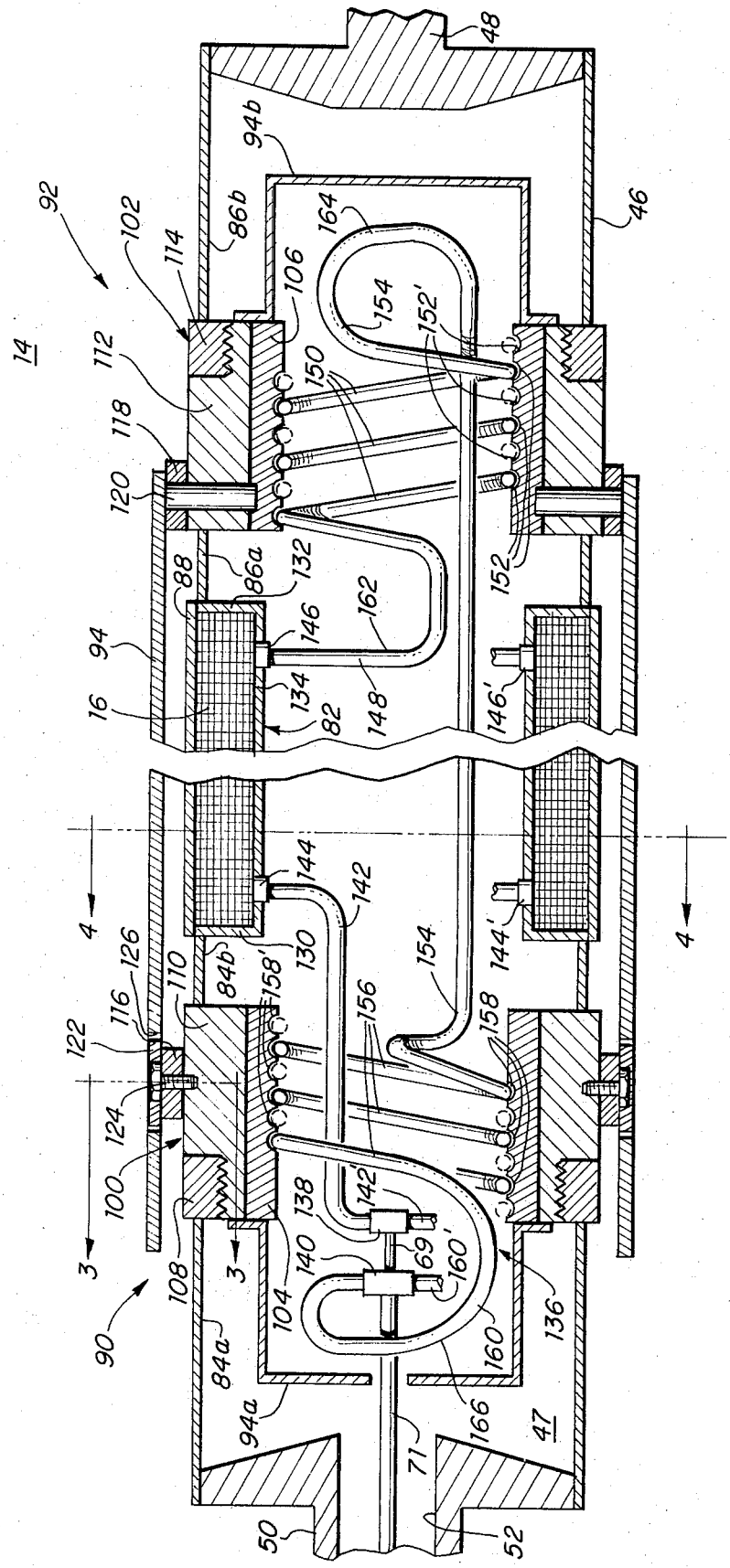
FIG. 2 is a schematic, elevational, cross-sectional view of a rotor containing a superconducting field winding according to this invention showing the supercooling distribution and collection system and heat exchangers.

Each heat exchanger 90, 92, FIG. 2, may include an annular member 100, 102 and an internal grooved member 104, 106 for receiving coils 156, 150 carrying supercooled fluid. Each annular member 100, 102 may include a pair of threadably engaged ring sections 108, 110 and 112, 114 which effectively separates the low thermal conductivity tubes 84 and 86 to which they are attached into two separate tubes 84a, 84b and 86a, 86b, respectively. Annular spacer rings 116 and 118 are mounted on annular members 100 and 102 and support radiation shield 94. The section through heat exchanger 92 shows a copper conductor pin 120 contacting radiation shield 94 and passing through spacer ring 118 and ring 112 to terminate in inner grooved member 106 to provide a good thermal conduction path between shield 94 and member 106. Radiation shield 94 may be fastened to spacer ring 118 by any suitable means, such as welding or the like. The sectional view through the other heat exchanger 90 is taken at a slightly different position in order to avoid showing a conductor pin similar to conductor pin 120 and instead show a key block 122 mounted on spacer ring 116 by means of a screw 124 which passes through spacer ring 116 into ring 110. The arrangement of key block 122 and keyway slot 126 keeps the radiation shield 94 in position but because keyway slot 126 is longer than keyblock 122 it permits thermal expansion and contraction of radiation shield 94 without damaging the structure.

Figure 3:
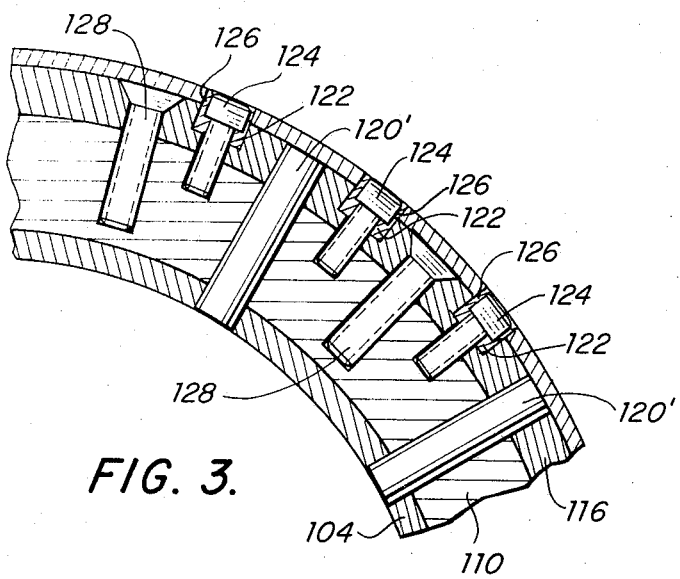
FIG. 3 is a diagrammatic, partially sectional view taken along lines 3—3 of FIG. 2 of a portion of one of the heat exchanger means showing the arrangement of the heat exchanger, spacer block and keys which secure the radiation shield.

As shown in FIG. 3 the key block 122, keyway slot 126 and fastening screws 124 are uniformly spaced about the circumference of annular spacer ring 116; copper conducting pins 120' are also uniformly spaced about the circumference of spacer ring 116, copper conducting pins 120 are uniformly spaced about the circumference of spacer ring 118. Also uniformly spaced about the circumference of spacer ring 116 are screws 128 which fasten spacer ring 116 to ring section 110; similar screws, not shown, are used to fasten spacer ring 118 to ring section 112 of heat exchanger 92.

Tubes 84a and 84b, FIG. 2, are suitably connected, such as by welding, with ring sections 108 and 110, respectively, and tubes 86a and 86b are similarly attached to ring sections 112 and 114, respectively. Tubes 84b and 86a are attached to radial sections 130 and 132, respectively, of compartment 82 which also includes an axial section 134 and cover 88 which is welded or otherwise suitably connected with radial sections 130 and 132. The supercooled fluid distribution and collection system which cools field winding 16 to approximately 4° K and heat exchangers 90 and 92 to approximately 20° K begins at T-junction 138 at inlet conduit 69 and ends at T-junction 140 at outlet conduit 71. Typically the cooling fluid is helium which is provided at 4° K by inlet conduit 69 and delivered by conduit 142 to inlet port 144 in axial section 134. The liquid helim moves through field winding 16 and eventually arrives at outlet port 146 in axial section 134 as a fluid which is part liquid and part vapor; the fluid is then conducted through conduit 148 to heat exchanger 92 where a number of coils 150 are formed to fit in and are soldered in grooves 152 of grooved inner member 106. Coils 150 terminate in conduit 154 which extends back down through the center of shaft 46 to heat exchanger 90 where it meets with three more coils 156, which are fitted and soldered into grooves 158 in grooved inner member 104. From the output of coils 156 the fluid flows through conduit 160 to T-junction 140 and then is removed from rotor 14 by outlet conduit 71 which is connected with the transfer system 72, FIG. 1. Although heat exchangers 92, 94 are shown with their cooling coils connected in series this is not a limitation as the coils may be serviced in parallel with each other and the field winding or may be serviced entirely independently from separate conduits.

Distribution and collection system 136 includes a second channel which is symmetrically disposed relative to the first channel just described to aid in balancing the machine. Only parts of the second channel have been shown in order to avoid the confusion inherent when so many conduits are attempted to be shown.

Thus the second channel begins at T-junction 138 with conduit 142' that delivers helium to inlet port 144' similar to inlet port 144 but diametrically opposed in its location. The fluid leaves the field winding 16 by means of outlet port 146' and interconnects, through another conduit similar to conduit 148, with a set of coils similar to coils 150 interstitially located in grooves 152' of grooved inner member 106. The output from those coils is then conducted by a conduit similar to conduit 154 to a second set of coils located in grooves 158' in grooved inner member 104. Finally a conduit 160' similar to conduit 160 carries the fluid from the output of those coils to T-junction 140.

The U-bend or loop 162 in conduit 148 serves as a convection trap between the warmer heat exchanger 92 at approximately 20°K and the colder, 4°K, field winding 16. Without the trap the centrifugal force field could cause the warm gas to flow backwards from heat exchanger 92 to field winding 16. This convection counter current is driven by the density difference in the centrifugal force field. In a centrifugal force field a fluid of variable density is stable when the low density or warm fluid is at a smaller radius than the high density or cold fluid. In the loop 162 the counter current convection flow is stopped in the region where the tube carries the helium radially inward. Similar convection traps may be formed by loops 164 and 166 in conduits 154 and 160, respectively. One feature of the heat exchangers 92, 94 which contributes to their efficiency is that they are discrete units i.e., cooling is effected at discrete positions along shaft 46 and not continuously along its length. In addition the provision of convection traps at the inlet and outlet of each heat exchanger, or at least one convection trap between each pair of heat exchanging devices operating at different average temperatures also greatly contributes to the efficiency of the cooling system. A convection trap according to this invention is not limited to a loop of coil as illustrated in FIG. 2. The convection trap may be made of any conduit which has a sufficiently radially directed course to trap the warmer, less dense, fluid nearer the center of the rotor and the cooler, more dense, fluid nearer the periphery of the rotor to prevent centrifugal convection in the centrifugal force field of the rotor.

Figure 5:
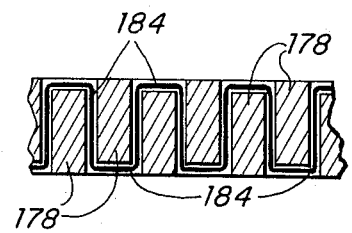
FIG. 5 is a schematic, cross-sectional view showing the arrangement of the insulating tape with the superconductors.
Figure 4:
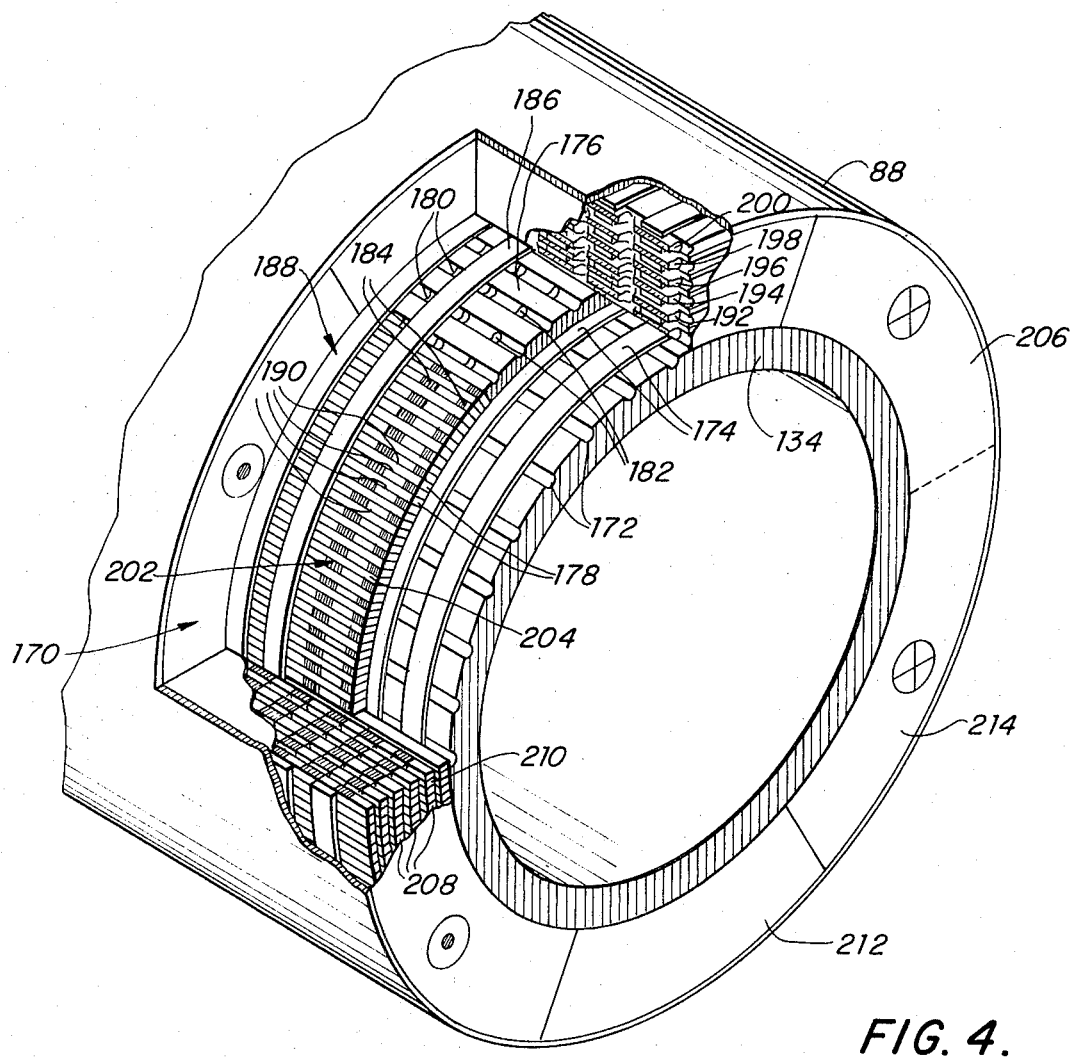
FIG. 4 is a diagrammatic, axonometric view of the field winding structure and field winding compartment taken along lines 4—4 of FIG. 2 with parts in cross-section and portions broken away.

Field winding 16 is included in a field winding structure 170, FIG. 4, which securely holds the winding and also permits free flow of the supercooled fluid in the winding. Field winding structure 170 is mounted on inner cylindrical member 134 which includes a plurality of axial grooves 172 in its outer surface for axially distributing the cooling fluid in compartment 82. A plurality of discrete, uniformly, closely spaced straps or bands 174 of fiberglass impregnated with an epoxy resin are mounted circumferentially on member 134 throughout its axial length. The circumferential spaces between the bands provide radial interstices for passage of supercooled fluid. A pole piece 176 is mounted on bands 174 and has wound about it a number of turns of superconductor 178. Pole piece 176 is as thick as the superconductors 178 are high and includes a plurality of uniformly spaced axial grooves 180 which provide axial distribution of the supercooled fluid and in which are located a number of uniformly spaced ports 182 which provide radial interstices for passage of supercooled fluid. The individual superconductors 178 are bound together by an epoxy tape 184 which is woven over one conductor and under the adjacent conductor, FIG. 5, in the space directly over an underlying band 174. In addition tapes 184, FIG. 4, have the same width as bands 174 so that they align fully with them. The spaces between the conductors produced by the presence of the spaced tapes provide radial interstices for passage of supercooled fluid. Additional spaces through which supercooled fluid can flow are created by the tapes beneath and above the superconductors. A second set of fiberglass straps or bands 186 secures in position winding layer 188 which includes superconductors 178 and pole piece 176. Bands 174, 186 are installed under tension to compress and bind the conductors against motion. The second set of bands 186 directly overlies tapes 184 and previous bands 174 so that the spaces 190 between adjacent superconductors 178 caused by the thickness of tape 184 remain free and the ports 182 are not blocked. Thus the supercooling fluid may flow along grooves 172 up between bands 174, superconductors 178 and spaces 190 and up through pole piece 176 and through ports 182 and then flow along axially through grooves 180. Additional layers of winding 192, 194, 196, 198 and 200 are similarly constructed to provide a rugged construction compatible with free flow of the supercooled fluid.

The construction of field structure 170 enables the economical and highly efficient use of the centrifugal force field itself to effect the distribution of the supercooling fluid. Thus the more dense, cold, supercooled fluid entering through inlet conduit 69 is at the center of the rotating shaft 46 and is therefore forced outwardly by the centrifugal force field, toward the periphery of shaft 46 where is located field winding 16 in compartment 82. Upon being hurled or forced to this distant radial position this more dense, colder supercooled fluid absorbs some of the heat from the field winding 16 and field winding structure 170 and thus becomes less dense and is compelled inwardly toward the center of shaft 46. Thus no additional means is required to effect the proper flow through field winding 16.

In FIG. 4, where is illustrated a two-pole machine, each winding layer includes two pole pieces and two coil windings. For example, in winding layer 188 a first coil winding 202 includes a first part 204 extending axially along one side of pole piece 176 and a second part 206 extending along the other side of pole piece 176 and a second coil winding 208 which includes a first part 210 extending axially along one side of pole piece 212 and a second part 214 extending along the other side of pole piece 212.

Figure 6:
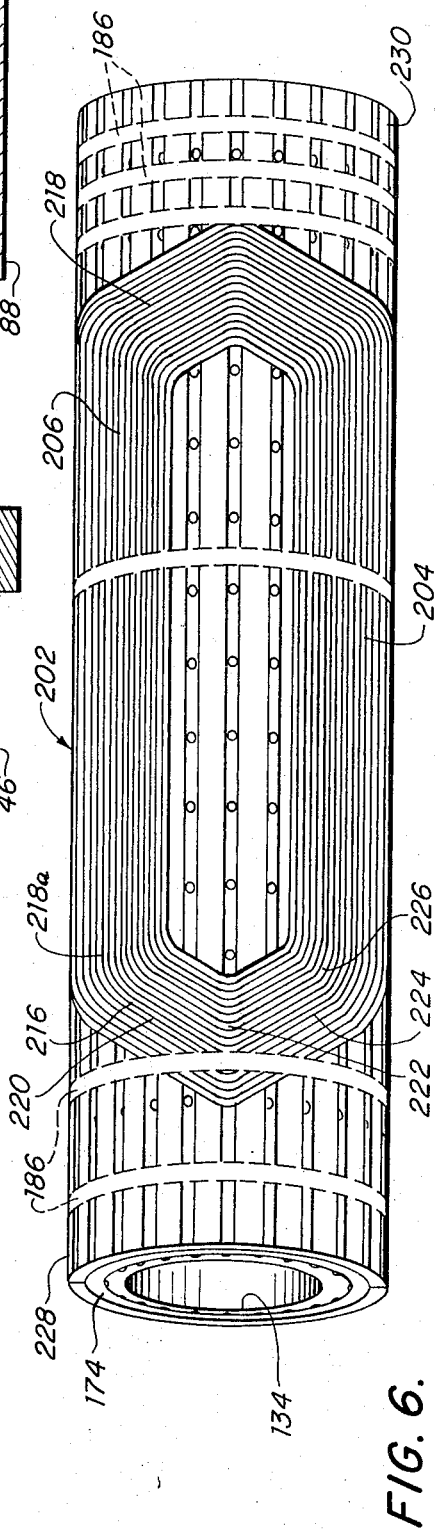
FIG. 6 is a diagrammatic, axonometric view of a portion of a field winding support structure showing a portion of a full layer of winding.

Each coil winding such as illustrated with coil winding 202, FIG. 6, includes four parts i.e., in addition to axially extending parts 204 and 206 there are end parts 216 and 218. In end part 216 each superconductor makes a first 60° bend 218a, then moves in a helical path 220 at 60° to the axis of cylindrical member 134, followed by a second 60° bend 222 after which a second helical path 224 is assumed which is also at 60° to the axis of member 134 but in the opposite direction and finally a 60° bend 226 which returns to part 204. Each coil winding in each winding layer of the field winding is constructed in the same manner. The triple bend and double helix geometry of each end part enables the whole field winding to lie in the same cylindrical plane so that no flaring or more difficult geometry need be effected. End pieces 228 and 230 are associated with each pole piece to complete the thickness of the layer beyond end parts 218 and 220 and they contain the same grooves and ports and are made of the same material, typically Micarta, as the pole pieces.

Figure 7:
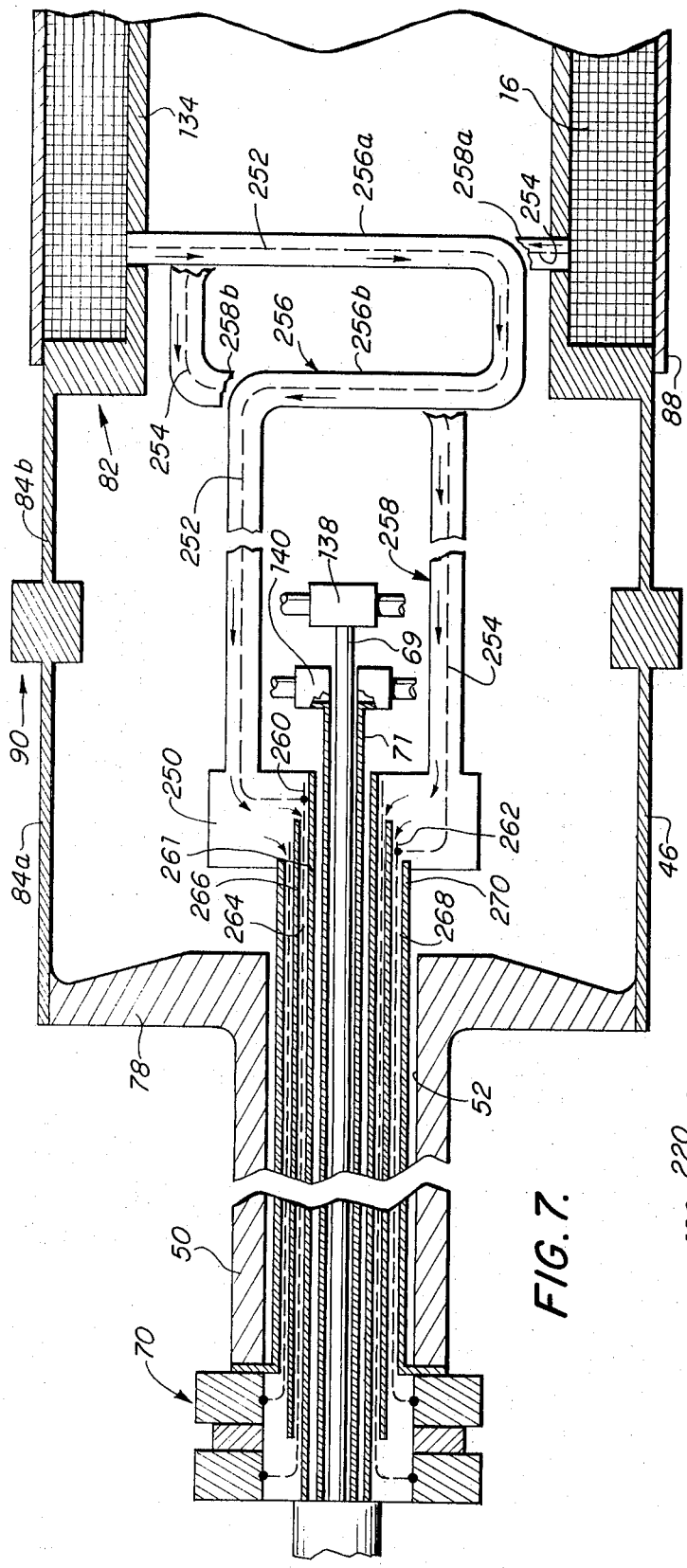
FIG. 7 is a schematic, cross-sectional view of the exciter end of the rotor showing a junction box for interconnection of the superconductors and normal leads.

Substantial heat may be conducted along the normally conducting leads from room temperature to the supercooled end. To prevent this heat from reaching the main superconducting winding 16 a junction box 250, FIG. 7, may be employed at the exciter end of shaft 46. Superconductors 252 and 254 deriving from diametrically opposed openings in cylindrical member 134 extend from winding 16 to junction box 250 encased in conduits 256 and 258, respectively, such as stainless steel tubes which conduct the supercooling fluid from within the field structure in compartment 82 to the inside of junction box 250. Each of conduits 256, 258 have two radially directed portions 256a, 256b and 258a, 258b, respectively, each of which forms a convection trap to prevent centrifugal convection current from causing counter flow of warmer fluid to compartment 82. Within junction box 250 the superconductors 252 and 254 are interconnected with the normal leads 260 and 262, respectively. Normal leads 260 and 262 are a cylindrical braided conductor formed of finely woven elements to permit the free flow through the conductor of the supercooled fluid flowing from the interior of junction box 250. Normal lead 260 is disposed in the annular space 264 formed between tube 261 and concentric insulator tube 266. Similarly normal lead 262 is disposed in annular space 268 formed between insulator tube 266 and an additional concentric insulator tube 270. These spaces 264 and 268 provide means whereby the supercooled fluid may flow along the normal leads 260 and 262 to slip rings 70 to further reduce the transfer of heat along the normal leads 260, 262 and then eventually to the superconductor 252 and 254. Typically junction box 250 is maintained at approximately 5°K.

Other embodiments will occur to those skilled in the art and are within the following claims:

What is claimed is:

1. A rotor for a cryogenic machine having a supercooled field winding comprising:
    a hollow shaft rotatably supported on axle means and having an internal vacuum chamber;
    a field winding structure having radial interstices, circumferential interstices and axial interstices;
    a field winding structure compartment carried by said shaft for supporting said field winding structure;
    low thermal conductivity interconnection means interconnecting said compartment with said axle means;
    at least one heat exchanger means each including a first member in thermal communication with said interconnection means at a discrete position on said interconnection means for removing heat from said interconnection means and a second member including a first conduit in thermal communication with said first member for removing heat from said first member using supercooled fluid flowing through said first conduit at an average temperature higher than that of the supercooled field winding; and
    a convection trap associated with each said heat exchanger means including a second conduit interconnected with said first conduit and having a portion having a course extending from larger to smaller radius to trap the warmer, less dense, fluid nearer the center of said rotor and the cooler, more dense, fluid nearer the periphery of said rotor to prevent centrifugal convection in the centrifugal force field of said rotor.

2. The rotor of claim 1 in which said axle means includes two axles one at either end of said rotor and said interconnection means includes two interconnection assemblies one interconnecting each axle with said compartment.

3. The rotor of claim 1 in which said compartment is recessed in said shaft and includes a cover at the surface of said shaft.

4. The rotor of claim 1 further including a radiation shield extending over said compartment and being in thermal communication with said heat exchanger means.

5. The rotor of claim 1 in which said first member of said heat exchanger means includes two threadably interconnectable rings.

6. The rotor of claim 1 in which said field winding structure compartment includes a cylindrical support member and said field winding support includes a first set of insulating circumferential straps fastened to said cylindrical support member in axially spaced relation to form radial, circumferential interstices for passing supercooling fluid;
    at least one field winding layer including at least two windings each including a pole piece mounted on said straps and having radial interstices for passing supercooling fluid;
    a winding wound about said pole piece on said straps; and
    end pieces completing the area of the layer beyond the ends of the winding and having radial interstices for passing supercooling fluid.

7. The field winding structure of claim 6 further including a plurality of tapes which are interwoven with the conductors which form the winding in circumferential paths aligned with said straps and which separate said conductors to provide radial interstices for passing supercooling fluid.

8. The field winding structure of claim 6 in which said pole pieces and said end pieces include axial grooves intersecting said radial interstices for passing supercooling fluid.

9. The field winding structure of claim 6 in which said cylindrical support member includes axial grooves in its surface bearing said first set of straps for passing supercooling fluid.

10. The rotor of claim 6 in which each end portion of a said winding includes a first 60° angle bend, a first 60° helical path to an apex, a second 60° angle bend at the apex, a second 60° helical path in the opposite direction to the first helical path and a third 60° angle bend.

11. The rotor of claim 1 further including an isolation junction interface between the superconducting field winding leads and normal conducting leads including a superconductor and a tube surrounding said superconductor and carrying the supercooled fluid, a junction box interconnected with said tubes and containing said supercooled fluid, a normal lead corresponding to each superconductor and interconnected therewith in said junction box, each of said normal leads including a cylindrical, braided conductor formed of a plurality of smaller conducting elements and supported between concentric insulator tubes between which said supercooled fluid passes.

12. The rotor of claim 6 in which said tapes are impregnated with thermosetting resin and are bonded to adjacent superconductors and circumferential straps.

13. The rotor of claim 6 in which there is a plurality of field winding layers and a plurality of sets of insulating circumferential straps, each field winding layer being mounted on one set of straps and being held in place by a second set of straps which mounts the next field winding layer.

14. The rotor of claim 13 in which each of the straps mounted with a field winding layer is aligned with a respective one of each of the tapes associated with that field winding layer and each of the straps and tapes associated with each of the field winding layers are aligned with those in adjacent layers to provide radial, circumferential interstices for passing supercooling fluid.

15. A field winding structure for the rotor of a cryogenic machine comprising:
a cylindrical support member;
a first set of insulating circumferential straps fastened to said cylindrical support member in axially spaced relation to form radial, circumferential interstices for passing supercooling fluid;
at least one field winding layer including at least two windings each including a pole piece mounted on said straps and having radial interstices for passing supercooling fluid;
a winding wound about said pole piece on said straps; and
end pieces completing the area of the layer beyond the ends of the winding and having radial interstices for passing supercooling fluid.

16. The field winding structure of claim 15 further including a plurality of tapes which are interwoven with the conductors which form the winding in circumferential paths aligned with said straps and which separate said conductors to provide radial interstices for passing supercooling fluid.

17. The field winding structure of claim 15 in which said pole pieces and said end pieces include axial grooves intersecting said radial interstices for passing supercooling fluid.

18. The field winding structure of claim 14 in which said cylindrical support member includes axial grooves in its surface bearing said first set of straps for passing supercooling fluid.

19. The rotor of claim 15 in which said tapes are impregnated with thermosetting resin and are bonded to adjacent superconductors and circumferential straps.

20. The rotor of claim 15 in which there is a plurality of field winding layers and a plurality of sets of insulating circumferential straps, each field winding layer being mounted on one set of straps and being held in place by a second set of straps which mounts the next field winding layer.

21. The rotor of claim 20 in which each of the straps mounted with a field winding layer is aligned with a respective one of each of the tapes associated with that field winding layer and each of the straps and tapes associated with each of the field winding layers are aligned with those in adjacent layers to provide radial, circumferential interstices for passing supercooling fluid.

22. An isolated junction interface between superconducting field winding leads and normal conducting leads including a superconductor and a tube surrounding said superconductor and carrying the supercooled fluid, a junction box interconnected with said tubes and containing said supercooled fluid, a normal lead corresponding to each superconductor and interconnected therewith in said junction box, each of said normal leads contained within a conduit for the passage of said supercooled fluid.

23. The isolated junction interface of claim 22 in which the said normal leads include a cylindrical, braided conductor formed of a plurality of smaller conducting elements and supported between concentric insulator tubes between which said supercooled fluid passes.

* * * * *